US012012784B2

(12) United States Patent
Yang

(10) Patent No.: US 12,012,784 B2
(45) Date of Patent: Jun. 18, 2024

(54) UNIVERSAL SECURITY LOCK FOR PORTABLE ELECTRONIC DEVICES AND ENGAGING MECHANISM THEREOF

(71) Applicant: JIN TAY INDUSTRIES CO., LTD., New Taipei (TW)

(72) Inventor: Kuo-Tsung Yang, Taipei (TW)

(73) Assignee: JIN TAY INDUSTRIES CO., LTD., New Taipei (TW)

( * ) Notice: Subject to any disclaimer, the term of this patent is extended or adjusted under 35 U.S.C. 154(b) by 308 days.

(21) Appl. No.: 17/519,478

(22) Filed: Nov. 4, 2021

(65) Prior Publication Data

US 2023/0139662 A1 May 4, 2023

(51) Int. Cl.
*E05B 73/00* (2006.01)
*E05B 73/02* (2006.01)

(52) U.S. Cl.
CPC ...... *E05B 73/0082* (2013.01); *E05B 73/0005* (2013.01); *E05B 73/02* (2013.01); *Y10T 70/40* (2015.04); *Y10T 70/5009* (2015.04)

(58) Field of Classification Search
CPC .. E05B 73/0082; E05B 73/0005; E05B 37/02; Y10T 70/5009; Y10T 70/40; Y10T 70/407; Y10T 24/4453; Y10T 292/0862
See application file for complete search history.

(56) References Cited

U.S. PATENT DOCUMENTS

| | | | | | |
|---|---|---|---|---|---|
| 380,961 | A * | 4/1888 | Waine | E05B 67/32 | 70/37 |
| 505,299 | A * | 9/1893 | Schneider | E05B 17/16 | 70/428 |
| 1,197,549 | A * | 9/1916 | Russell | E05B 75/00 | 70/17 |
| 1,505,660 | A * | 8/1924 | Moersch | E05B 75/00 | 70/17 |
| 1,570,458 | A * | 1/1926 | Cederlof | E05B 75/00 | 70/17 |
| 1,950,757 | A * | 3/1934 | Smith-Stange | E05B 75/00 | 119/806 |

(Continued)

FOREIGN PATENT DOCUMENTS

| | | |
|---|---|---|
| TW | 392753 | 6/2000 |
| TW | 413259 | 11/2000 |

(Continued)

*Primary Examiner* — Christine M Mills
*Assistant Examiner* — Faria F Ahmad
(74) *Attorney, Agent, or Firm* — Sinorica International Patent & Trademark

(57) ABSTRACT

A universal security lock for portable electronic devices has an engaging mechanism which has a base, an expanding rod, and two gripping fingers. The expanding rod is slidable along an engaging direction. Each of the gripping fingers is pivotally mounted on the base and disposed on a respective side of the expanding rod. When the expanding rod is moved toward the engaging direction, an end of the expanding rod abuts against the two gripping fingers and expands the gripping fingers gradually such that the gripping fingers can be engaged in security slots of a portable electronic device. At least one of the gripping fingers has a protrusion extending toward the other gripping finger. The expanding rod selectively abuts against the protrusion to further expand the gripping finger.

13 Claims, 12 Drawing Sheets

(56) References Cited

U.S. PATENT DOCUMENTS

| | | | | | |
|---|---|---|---|---|---|
| 1,971,049 | A * | 8/1934 | Pelle | E05B 37/02 | 70/322 |
| 1,998,050 | A * | 4/1935 | Gasdorf | B60C 29/066 | 138/89.1 |
| 2,066,654 | A * | 1/1937 | Smith-Stange | E05B 75/00 | 70/17 |
| 5,701,769 | A * | 12/1997 | Hall | E05B 73/00 | 70/58 |
| 6,058,744 | A * | 5/2000 | Ling | E05B 37/025 | 70/312 |
| 6,199,412 | B1 * | 3/2001 | Kennedy | E05B 73/0005 | 70/164 |
| 6,401,502 | B1 * | 6/2002 | Yang | E05B 73/0082 | 70/30 |
| 6,672,117 | B2 * | 1/2004 | Yu | E05B 67/003 | 70/333 R |
| 7,234,326 | B1 * | 6/2007 | Lu | E05B 73/0082 | 70/57 |
| 8,307,676 | B2 * | 11/2012 | Irisawa | F41B 15/02 | 70/17 |
| 9,187,934 | B1 * | 11/2015 | Lee | E05B 73/0017 | |
| 10,260,832 | B2 * | 4/2019 | Bowe, Jr. | E05B 19/00 | |
| 10,378,249 | B1 * | 8/2019 | Lee | E05B 73/0082 | |
| 10,400,482 | B2 * | 9/2019 | Kao | G06F 1/1656 | |
| 10,808,431 | B2 * | 10/2020 | Su | E05B 73/0005 | |
| 11,434,659 | B2 * | 9/2022 | Wu | E05B 15/008 | |
| 2008/0034816 | A1 * | 2/2008 | Lu | E05B 73/0082 | 70/58 |
| 2008/0053168 | A1 * | 3/2008 | Lu | E05B 73/0082 | 70/58 |
| 2008/0163653 | A1 * | 7/2008 | Anderson | E05B 73/0005 | 70/58 |
| 2008/0258475 | A1 * | 10/2008 | Chung | E05C 9/1875 | 292/25 |
| 2017/0247916 | A1 * | 8/2017 | Kao | E05B 73/0082 | |
| 2019/0226243 | A1 * | 7/2019 | Lee | E05B 73/0082 | |
| 2020/0080346 | A1 * | 3/2020 | Wu | E05B 73/0082 | |
| 2020/0181950 | A1 * | 6/2020 | Su | E05B 37/02 | |
| 2020/0181951 | A1 * | 6/2020 | Su | E05B 73/0082 | |
| 2020/0248477 | A1 * | 8/2020 | Wu | E05B 15/008 | |
| 2021/0254369 | A1 * | 8/2021 | Su | E05B 73/0082 | |
| 2022/0205283 | A1 * | 6/2022 | Yang | E05B 73/0082 | |
| 2023/0079422 | A1 * | 3/2023 | Su | E05B 73/0005 | 70/21 |
| 2023/0133788 | A1 * | 5/2023 | Yang | E05B 73/0005 | 70/58 |
| 2023/0160236 | A1 * | 5/2023 | Klinkman | E05B 73/0005 | 70/58 |
| 2023/0175292 | A1 * | 6/2023 | Su | E05B 73/0005 | 70/58 |
| 2023/0228128 | A1 * | 7/2023 | Wang | E05B 73/0082 | 70/58 |
| 2023/0228129 | A1 * | 7/2023 | Wang | E05B 73/0082 | 70/58 |
| 2023/0243191 | A1 * | 8/2023 | Wang | E05B 73/0082 | 70/58 |

FOREIGN PATENT DOCUMENTS

| | | | |
|---|---|---|---|
| TW | 467185 | | 12/2001 |
| TW | M401684 | | 4/2011 |
| TW | 201740004 | A | 11/2017 |
| TW | M583478 | | 9/2019 |
| TW | I737524 | B | 8/2021 |
| WO | 2021051725 | A1 | 3/2021 |

* cited by examiner

UNIVERSAL SECURITY LOCK FOR PORTABLE ELECTRONIC DEVICES AND ENGAGING MECHANISM THEREOF

BACKGROUND OF THE INVENTION

1. Field of the Invention

The present invention relates to a security lock, especially to a security lock that is configured to secure portable electronic devices.

2. Description of the Prior Arts

A portable device, such as a laptop, often has a security slot formed in its case such that a specialized security lock can be used for securing the portable device to a permanent object, such as a table or a display case. The security lock prevents the portable device from theft when displayed in showrooms or when temporarily left unattended in public areas such as a library.

The security slot is a hole formed through an exterior wall of the case of the portable device. An end of the security lock is fastened to the permanent object. An expandable gripper is mounted on another end of the security lock. The expandable gripper is configured to be mounted through the security slot and then expanded inside the case such that the gripper is engaged in the security slot to prevent the gripper from being pulled out. As a result, the portable device can be fastened to the permanent object using the security lock.

The security slot has a variety of specifications, and each of the specifications features a unique opening width; meanwhile, thickness of the exterior wall of the case varies from one portable device to another portable device. However, the expandable gripper of the conventional security lock can only be expanded to a specific opened position; that is, the expandable gripper can only expand to a specific width. As a result, each security lock is compatible only with a specific type of security slot, which causes inconvenience to a user and increases cost. For example, each time the user purchases a new laptop with a different security slot, a new security lock has to be prepared. When laptops of different security slots are displayed in the showroom, security locks of different specifications have to be prepared, which is troublesome and costly.

To be more specific, there are three major security slot systems, which are Kensington Slot™, Noble Wedge Slot™, and Kensington Nano Slot™. The Kensington Slot™ has standard rectangular slots, and has introduced oblong slots recently. The Noble Wedge Slot™ has wedge holes, and has introduced 3 mm by 5 mm rectangular hole recently for DELL™ laptops as well as other laptops. As a result, there are totally six different kinds of security slots from the three major systems.

Moreover, among security slots of the same kind, the security slot in one laptop may differ from the security slot in another laptop when said two laptops are of different brands. For example, thickness of a metal plate where the security slot is formed may vary, thickness of the laptop case may vary, and assembly position of said metal plate on the laptop case may vary. As a result, one security lock cannot be employed universally for different kinds of security slots.

To overcome the shortcomings, the present invention provides a universal security lock for portable electronic devices and an engaging mechanism thereof to mitigate or obviate the aforementioned problems.

SUMMARY OF THE INVENTION

The main objective of the present invention is to provide a universal security lock for portable electronic devices and an engaging mechanism that are compatible to different types of security slots for ease of use and cost reduction. The universal security lock for portable electronic devices has an engaging mechanism, a rod-returning resilient element, a controlling part, and a lock core. The engaging mechanism has a base, an expanding rod, and two gripping fingers. The base has an engaging direction. The expanding rod is disposed on the base and is slidable along the engaging direction. An end, which is toward the engaging direction, of the expanding rod is defined as an abutting end. A width of the abutting end gradually decreases toward the engaging direction. The two gripping fingers are elongated, and each of the gripping fingers has an inner end, an inner surface, an outer surface, and an electronic-device-engaging portion. The inner end is pivotally connected to the base. Each of the two inner ends of the two gripping fingers is disposed on a respective one of two opposite sides of the expanding rod. The inner surface faces toward another one of the gripping fingers. The outer surface is opposite to the inner surface. The electronic-device-engaging portion protrudes from the outer surface and is disposed on an outer end of the gripping finger. When the expanding rod is moved toward the engaging direction, the abutting end of the expanding rod abuts against the two inner surfaces of the two gripping fingers and drives the two electronic-device-engaging portions to move away from each other gradually. The two gripping fingers are respectively defined as a first gripping finger and a second gripping finger; the inner surface of the first gripping finger has a first abutting area and a first protrusion; the first protrusion protrudes from the first abutting area and extends toward the second gripping finger; the abutting end of the expanding rod selectively abuts against the first abutting area or the first protrusion. The rod-returning resilient element is connected to the expanding rod of the engaging mechanism and drives the expanding rod to move in a direction reverse to the engaging direction. The controlling part is rotatably disposed in the base of the engaging mechanism. The controlling part and the expanding rod are arranged along the engaging direction. The lock core is disposed on the base of the engaging mechanism and is connected to the controlling part. The lock core has an unlocked status and a locked status; in the unlocked status, the lock core is rotatable relative to the base; in the locked status, the lock core is unrotatable relative to the base. When the controlling part is rotated relative to the base, the expanding rod of the engaging mechanism is driven by the rotation of the controlling part to change a position of the expanding rod along the engaging direction, thereby changing a distance between the two electronic-device-engaging portions.

To engage the universal security lock with an electronic device, first pivot the two gripping fingers toward each other such that the two electronic-device-engaging portions of the two gripping fingers are closely adjacent to each other. Then, insert the two electronic-device-engaging portions into a security slot of the electronic device, and then drive the expanding rod to move via the controlling part and the lock core to engage the two gripping fingers in the security slot, preventing the two gripping fingers from being pulled out from the security slot.

To be specific, the expanding rod abuts against the abutting area of the gripping finger to engage in security slots that are of less widths; when engaging in security slots of greater widths, the expanding rod keeps moving along the engaging direction to abut against the protrusion of the gripping fingers such that the two gripping fingers are moved away from each other to engage in said wider security slots.

The advantages of the present invention are as follows:

First, movement of the expanding rod along the engaging direction gradually expands the two gripping fingers such that the two gripping fingers are engaged in the security slot; that is, as long as the expanding rod is continuously moved toward the engaging direction, the two gripping fingers will be moved away from each other continuously until stopped by width of the security slot. Therefore, the present invention is compatible with security slots of different widths and can be adjusted in a stepless manner.

Second, the protrusion of the gripping finger allows the engaging mechanism to engage in wider security slots without increasing size of the engaging mechanism, thereby reducing size of the engaging mechanism.

To be specific, assuming the inner surface of the gripping finger is straight, the gripping fingers will be substantially parallel to the expanding rod soon after the abutting end of the expanding rod passes the inner ends of the gripping fingers in the engaging direction. As a result, movement of the expanding rod can no longer expand the gripping fingers effectively.

Therefore, sizes of the gripping finger and the expanding rod need to be increased dramatically in order for the gripping fingers with straight inner surfaces to engage in wider security slots.

On the other hand, by forming a protrusion on the inner surface of the gripping finger and dispose the protrusion farther away from the inner end of said gripping finger, the expanding rod can abut against the protrusion to quickly expand the two gripping fingers. As a result, the sizes of the gripping fingers and the expanding rod do not have to be increased, and the size of the engaging mechanism is significantly smaller compared to counterparts with gripping fingers having straight inner surfaces.

Other objectives, advantages and novel features of the invention will become more apparent from the following detailed description when taken in conjunction with the accompanying drawings.

DETAILED DESCRIPTION OF THE PREFERRED EMBODIMENTS

With reference to FIGS. 1 to 4, a universal security lock for portable electronic devices in accordance with the present invention comprises an engaging mechanism 10, a rod-returning resilient element 20, a controlling part 30, and a lock core 40.

Figure 4:
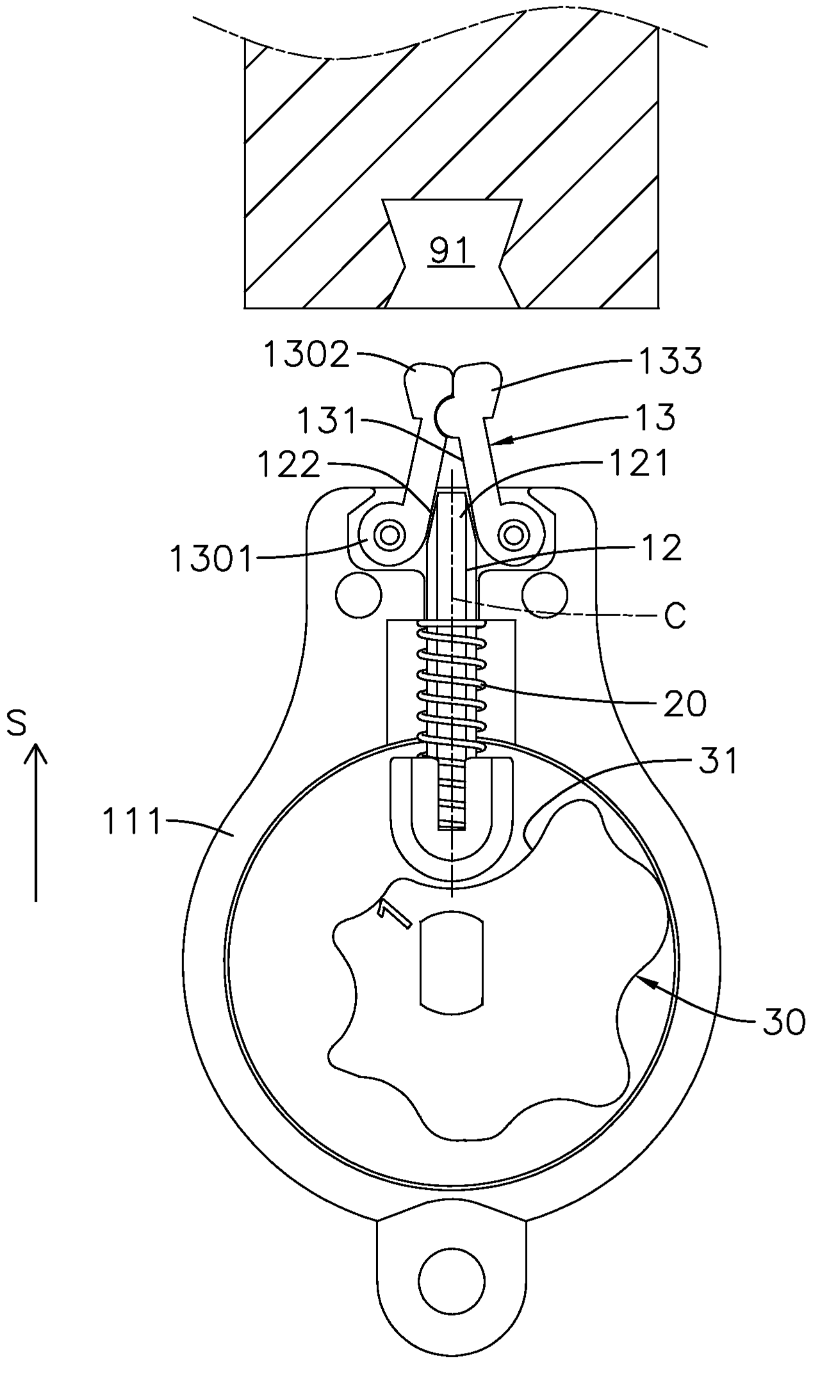
FIGS. 4 and 5 are operational schematic top views of the universal security lock in FIG. 1.

The engaging mechanism 10 has a base 11, an expanding rod 12, and two gripping fingers 13. In the preferred embodiment, the base 11 has a lower seat 111, an upper cover 112, and a finger opening 113. The lower seat 111 forms an inner space and has an engaging direction S (as shown in FIG. 4). The finger opening 113 is formed on an end of the lower seat 111 toward the engaging direction S. The finger opening 113 is connected to an inner space of the lower seat 111. In another preferred embodiment, the base 11 is a plate mounted in other components.

The expanding rod 12 is slidably disposed on the lower seat 111 of the base 11 and is slidable along the engaging direction S. An end, which is toward the engaging direction S, of the expanding rod 12 is defined as an abutting end 121. A width of the abutting end 121 gradually decreases toward the engaging direction S.

To be specific, the expanding rod 12 has two guide inclines 122. Each of the two guide inclines 122 is formed on a respective one of two opposite sides, which are divided by the centerline C (as shown in FIG. 4), of the expanding rod 12. The two guide inclines 122 are each inclined relative to the centerline C of the expanding rod 12, and extend along the engaging direction S to an end surface of the corresponding abutting end 121. A distance between the two guide inclines is reduced toward the engaging direction S.

The two gripping fingers 13 are elongated. Each of the gripping fingers 13 has an inner end 1301, an outer end 1302, an inner surface 131, an outer surface 132, and an electronic-device-engaging portion 133. The inner end 1301 is pivotally connected to the lower seat 111 of the base 11 and disposed in the inner space of the lower seat 111. Each of the two inner ends 1301 of the two gripping fingers 13 is disposed on a respective one of two opposite sides of the expanding rod 12. The two outer ends 1302 of the two gripping fingers 13 protrude from the base 11 via the finger opening 113.

The inner surface 131 of each gripping finger 13 faces toward another one of the two gripping fingers 13. The outer surface 132 and the inner surface 131 of each gripping finger 13 are disposed opposite each other. The electronic-device-engaging portion 133 of each gripping finger 13 is protruded on the outer surface 132 of said gripping finger 13 and located on the outer end 1302 of said gripping finger 13.

Figure 5:
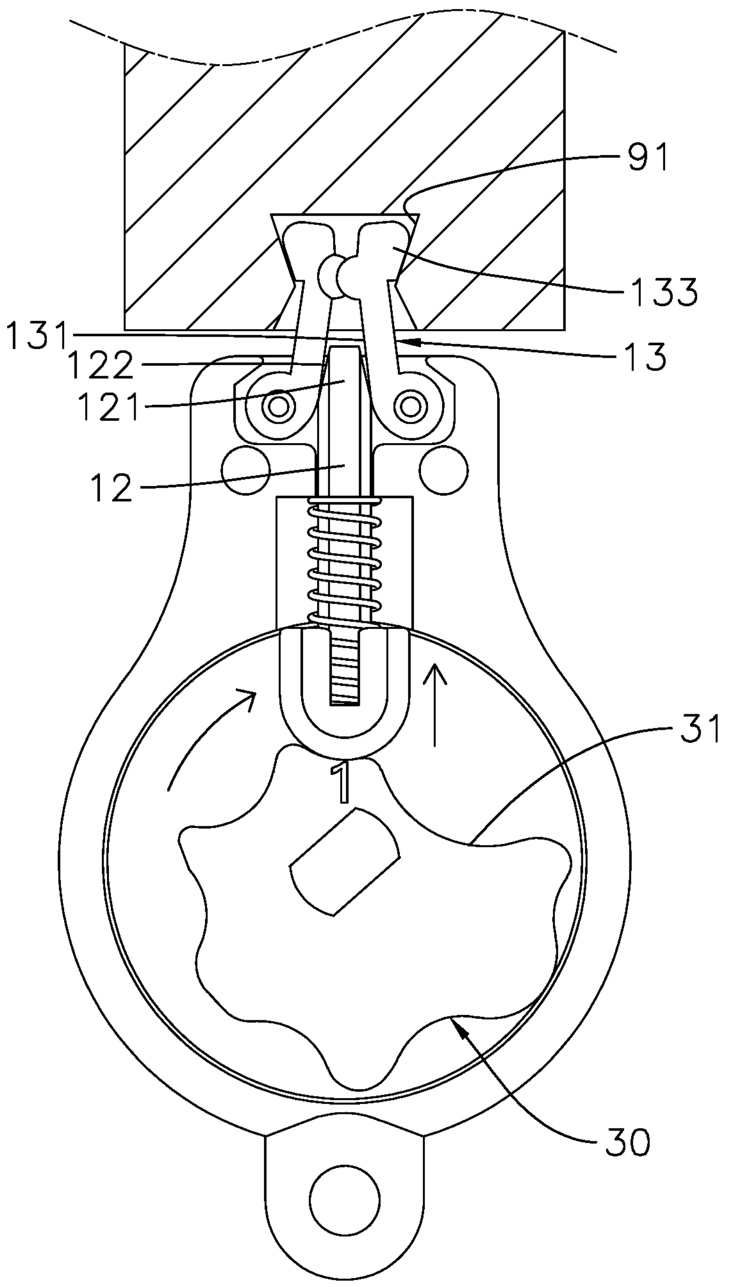

With reference to FIGS. 4 and 5, when the expanding rod 12 is moved toward the engaging direction S, the abutting end 121 of the expanding rod 12 abuts against the two inner surfaces 131 of the two gripping fingers 13 to make the two gripping fingers 13 pivot away from each other such that the two electronic-device-engaging portions 133 are moved away from each other gradually.

Figure 3:
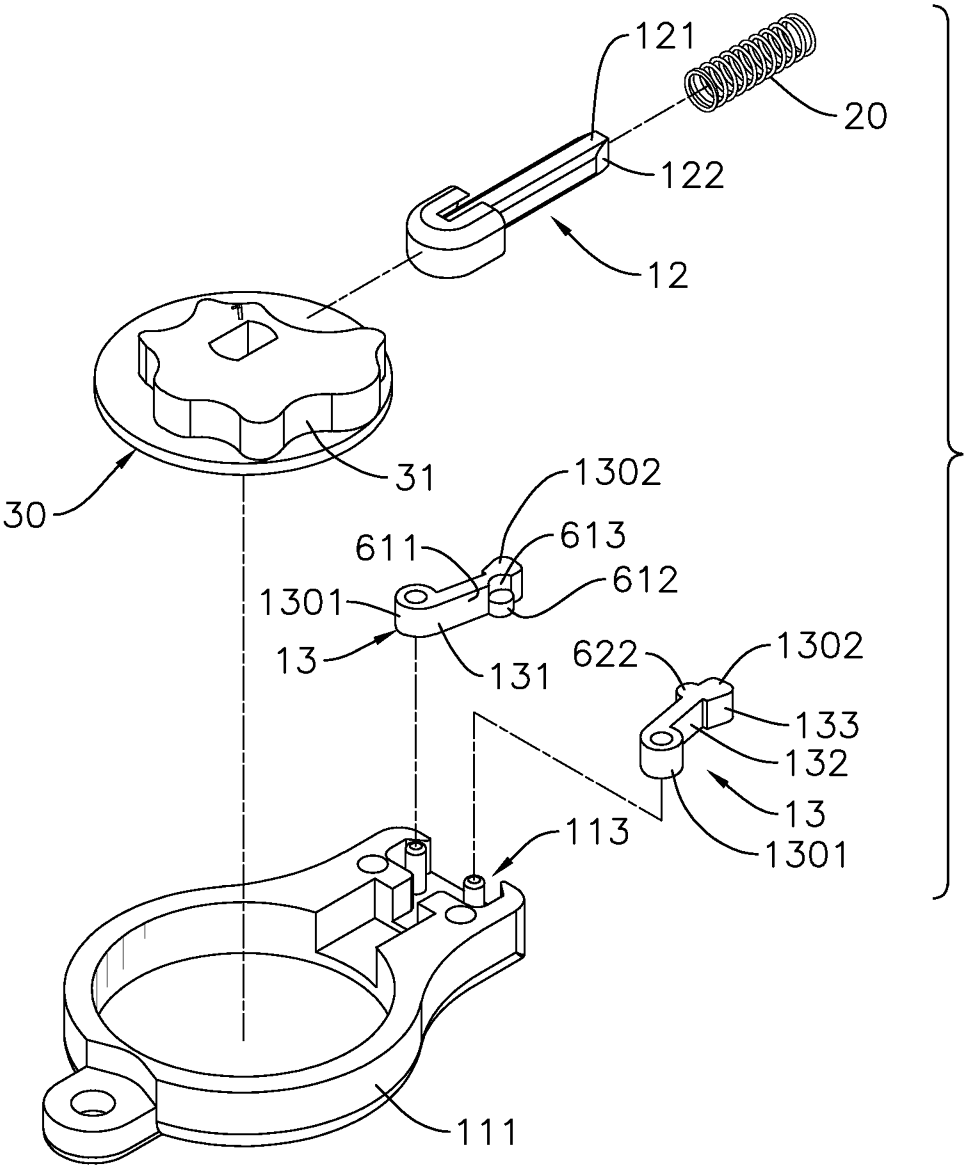
FIG. 3 is a partial exploded perspective view of the universal security lock in FIG. 1.
Figure 6A:
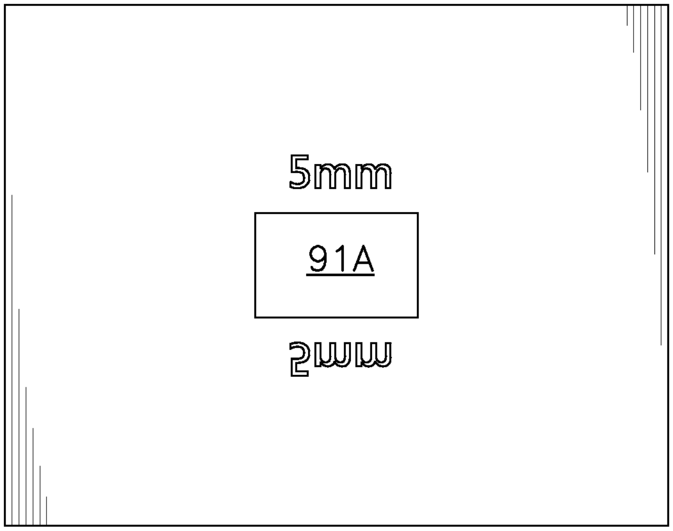
FIG. 6A is a front view of a 5-mm-wide security slot.
Figure 6B:
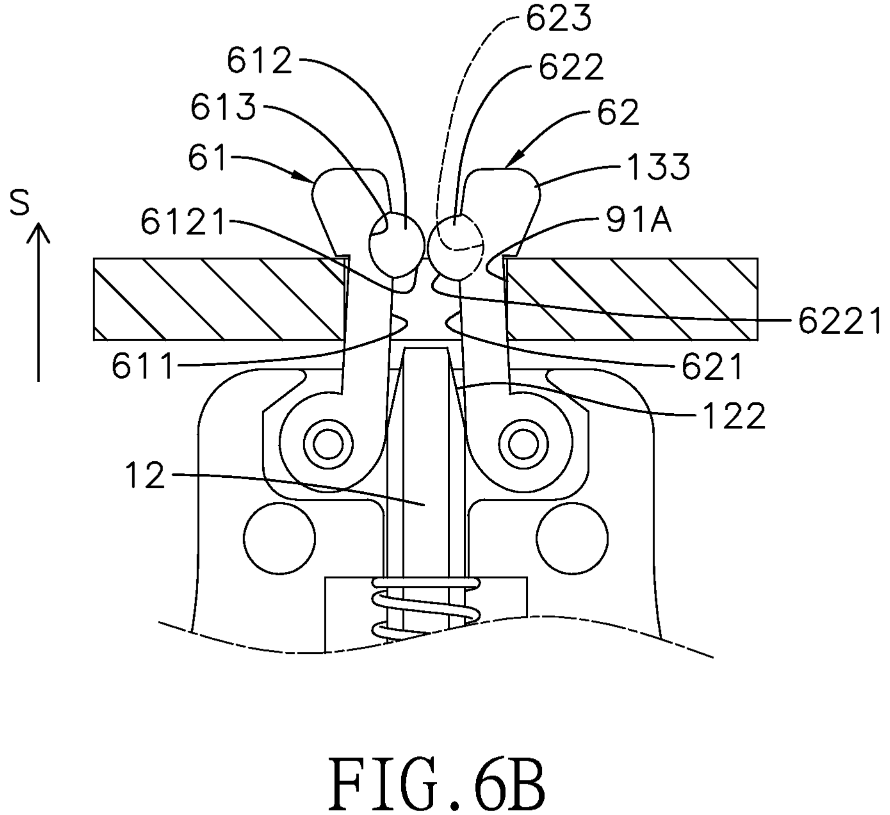
FIG. 6B is an enlarged schematic top view of the universal security lock in FIG. 1, showing the universal security lock engaged in the security slot shown in FIG. 6A.
Figure 7A:
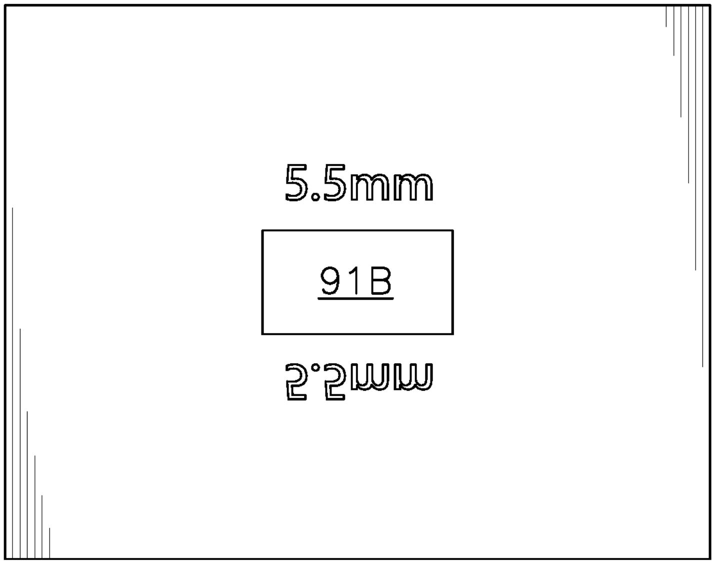
FIG. 7A is a front view of a 5-mm-wide security slot.
Figure 7B:
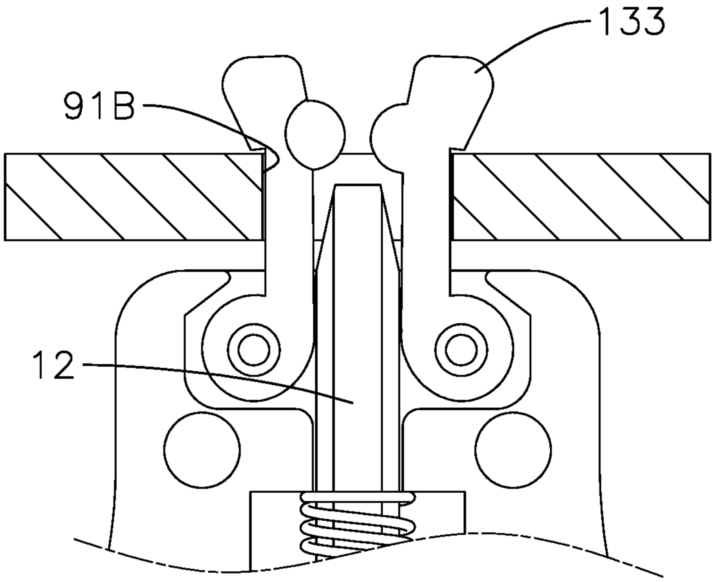
FIG. 7B is an enlarged schematic top view of the universal security lock in FIG. 1, showing the universal security lock engaged in the security slot shown in FIG. 7A.
Figure 8A:
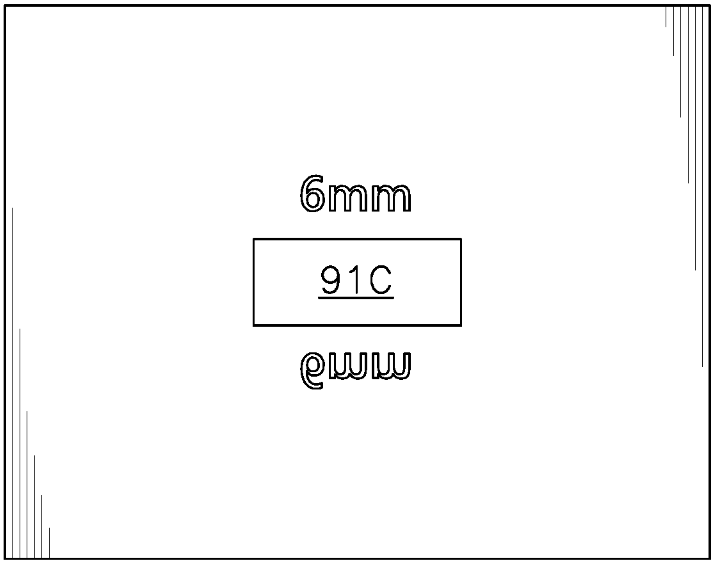
FIG. 8A is a front view of a 6-mm-wide security slot.
Figure 8B:
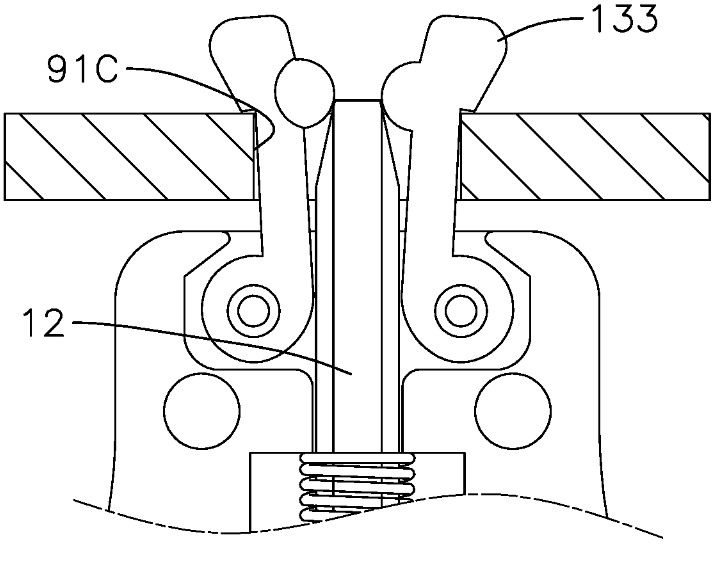
FIG. 8B is an enlarged schematic top view of the universal security lock in FIG. 1, showing the universal security lock engaged in the security slot shown in FIG. 8A.
Figure 9A:
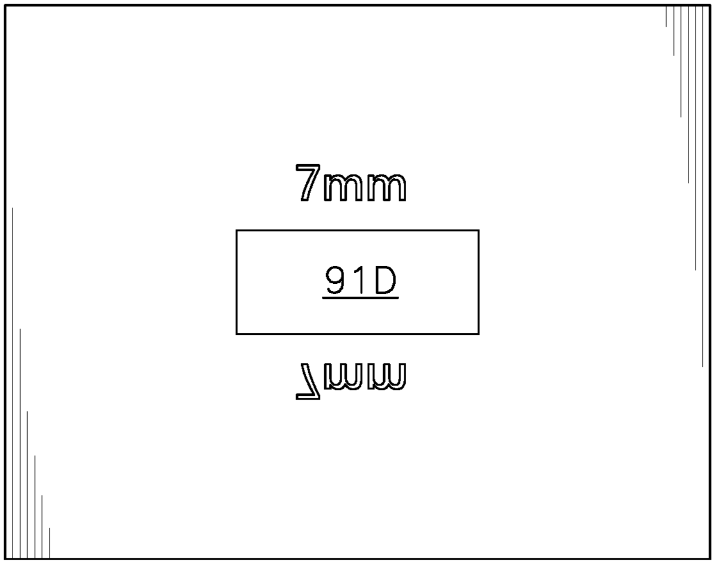
FIG. 9A is a front view of a 7-mm-wide security slot.
Figure 9B:
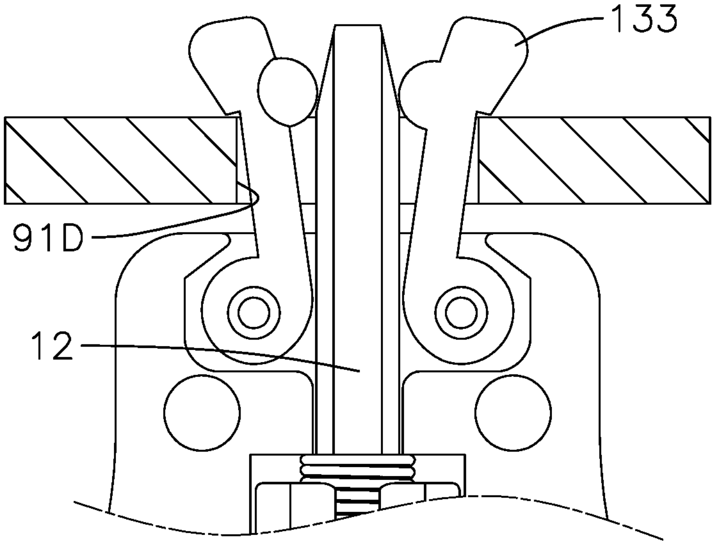
FIG. 9B is an enlarged schematic top view of the universal security lock in FIG. 1, showing the universal security lock engaged in the security slot shown in FIG. 9A.

With reference to FIGS. 3 and 6B, in the preferred embodiment, the two gripping fingers 13 are identical in shape but are mounted differently, but shapes of the two gripping fingers 13 may be different.

For ease of explaining detailed features of the gripping fingers 13, the two gripping fingers 13 are respectively defined as a first gripping finger 61 and a second gripping finger 62 (as shown in FIG. 6B).

The first gripping finger 61 has a first abutting area 611 and a first protrusion 612, and a second recess 613 formed on the inner surface 131 of the first gripping finger 61, but the second recess 613 can be omitted depending on circumstances.

The first abutting area 611 is elongated and extends from the inner end to the outer end of the first gripping finger 61. To be specific, the first abutting area 611 is planar and extends along a straight line, but the first abutting area 611 is not limited thereto; for example, the first abutting area 611 can be a slightly curved surface.

The first protrusion 612 protrudes from the first abutting area 611, extending toward the second gripping finger 62, and disposed on an end, which is toward the engaging direction S, of the second abutting area 621. The abutting end 121 of the expanding rod 12 selectively abuts against the first abutting area 611 or the first protrusion 612; that is, when the expanding rod 12 is moved toward the engaging direction S, the abutting end 121 first abuts against the first abutting area to make the first gripping finger 61 pivot away from the second gripping finger 62, and then the abutting end 121 abuts against the first protrusion 612 to make the first gripping finger 61 pivot in the same direction. By forming the first protrusion 612, the expanding rod 12 is capable of making the two gripping fingers 13 pivot away from each other more effectively.

The second gripping finger 62 has a second abutting area 621, a second protrusion 622, and a first recess 623 formed on the inner surface 131 of the second gripping finger 62, but the second protrusion 622 can be omitted depending on circumstances; that is, only one of the two gripping fingers 13 need to have the protrusion formed on the inner surface 131.

The second abutting area 621 is elongated. The second protrusion 622 protrudes from the second abutting area 621, extending toward the first gripping finger 61, and disposed on an end, which is toward the engaging direction S, of the second abutting area 621. The abutting end 121 of the expanding rod 12 selectively abuts against the second abutting area 621 or the second protrusion 622.

When the first gripping finger 61 and the second gripping finger 62 pivot toward each other, the first protrusion 612 of the first gripping finger 61 is movable into the first recess 623 of the second gripping finger 62, and meanwhile the second protrusion 622 of the first gripping finger 62 is movable into the second recess 613 of the first gripping finger 61 such that the outer end of the first gripping finger 61 may pivot toward the second gripping finger 62 until the two outer ends of the two gripping fingers 13 abut against each other. By forming the second recess 613 and the first recess 623, a range of an angle at which the two gripping fingers 13 are pivotal toward each other is not reduced by the first protrusion 612 and the second protrusion 622. That is, coordination between the protrusion and the recess increases the range of the angle at which the two gripping fingers 13 are pivotal away from each other when abutted by the expanding rod 12.

In the preferred embodiment, the first protrusion 612 of the first gripping finger 61 has an abutting curved surface 6121. When the abutting end 121 of the expanding rod 12 abuts against the first protrusion 612, the abutting curved surface 6121 is abutted by the abutting end 121 to move the electronic-device-engaging portion 133 of the first gripping finger 61.

Similarly, the second protrusion 622 of the second gripping finger 62 has an abutting curved surface 6221 (as shown in FIG. 6B). When the abutting end 121 of the expanding rod 12 abuts against the second protrusion 622, the abutting curved surface 6221 is abutted by the abutting end 121 to move the electronic-device-engaging portion 133 of the second gripping finger 62.

With reference to FIGS. 3 to 5, the rod-returning resilient element 20 is connected to the expanding rod 12 of the engaging mechanism and drives the expanding rod 12 to move in a direction reverse to the engaging direction S such that the expanding rod 12 is retracted in the finger opening 113 of the base 11, allowing the two gripping fingers 13 to pivot toward each other when the expanding rod 12 is not moved by the controlling part 30. The rod-returning resilient element 20 is preferably a compression spring located around the expanding rod 12.

The controlling part 30 is rotatably disposed in the inner space of the lower seat 111 of the base 11. The controlling part 30 and the expanding rod 12 are arranged along the engaging direction S. The controlling part 30 has an annular curved surface 31. The annular curved surface 31 surrounds a rotation axis of the controlling part 30 and is capable of driving the expanding rod 12 of the engaging mechanism 10 to move along the engaging direction S.

When the controlling part 30 is rotated relative to the base 11, the expanding rod of the engaging mechanism 10 is driven by the annular curved surface 31 to change a position of the expanding rod 12 along the engaging direction S, thereby changing a distance between the two electronic-device-engaging portions 133.

Figure 1:
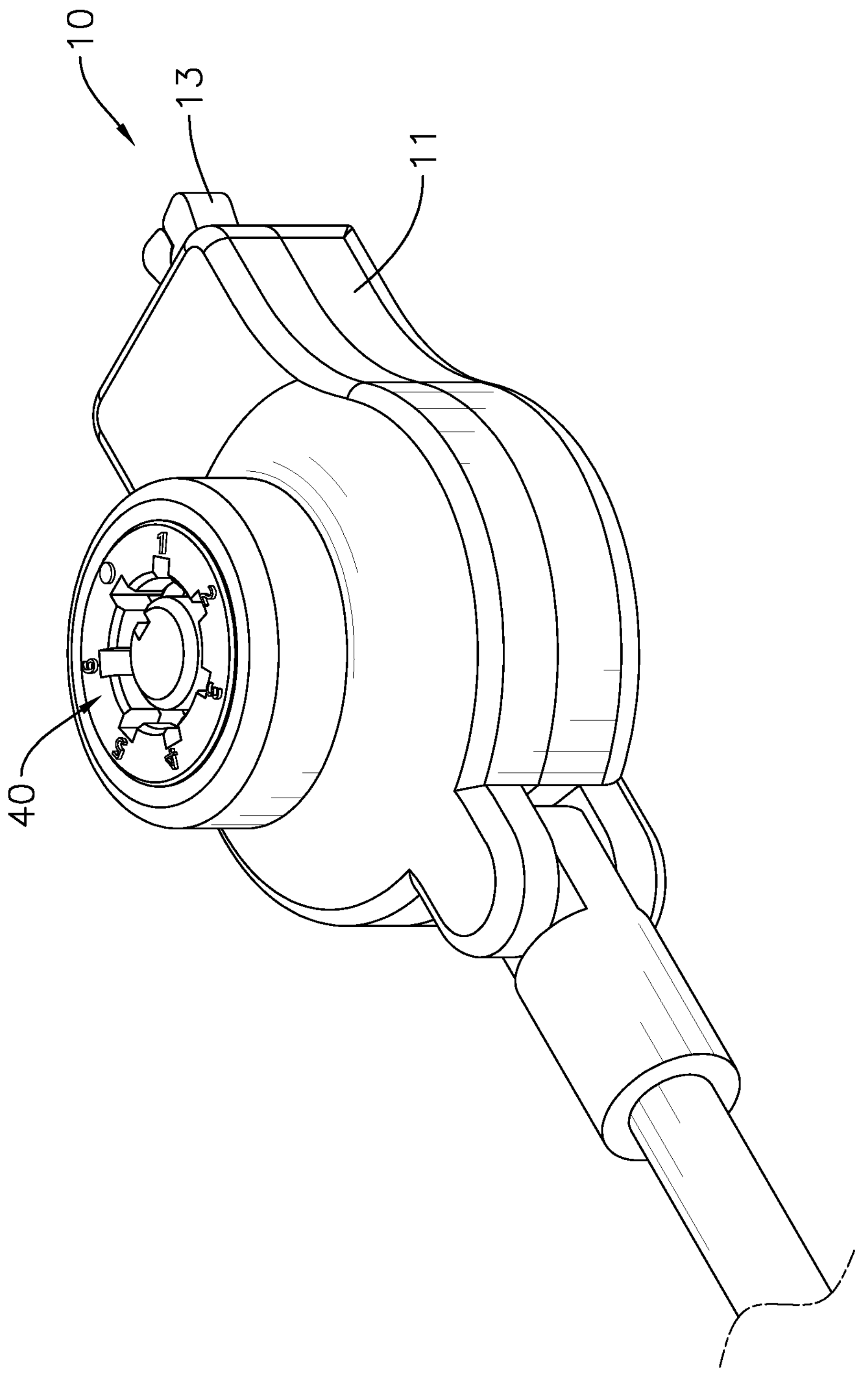
FIG. 1 is a perspective view of a first embodiment of a universal security lock for portable electronic devices in accordance with the present invention.
Figure 2:
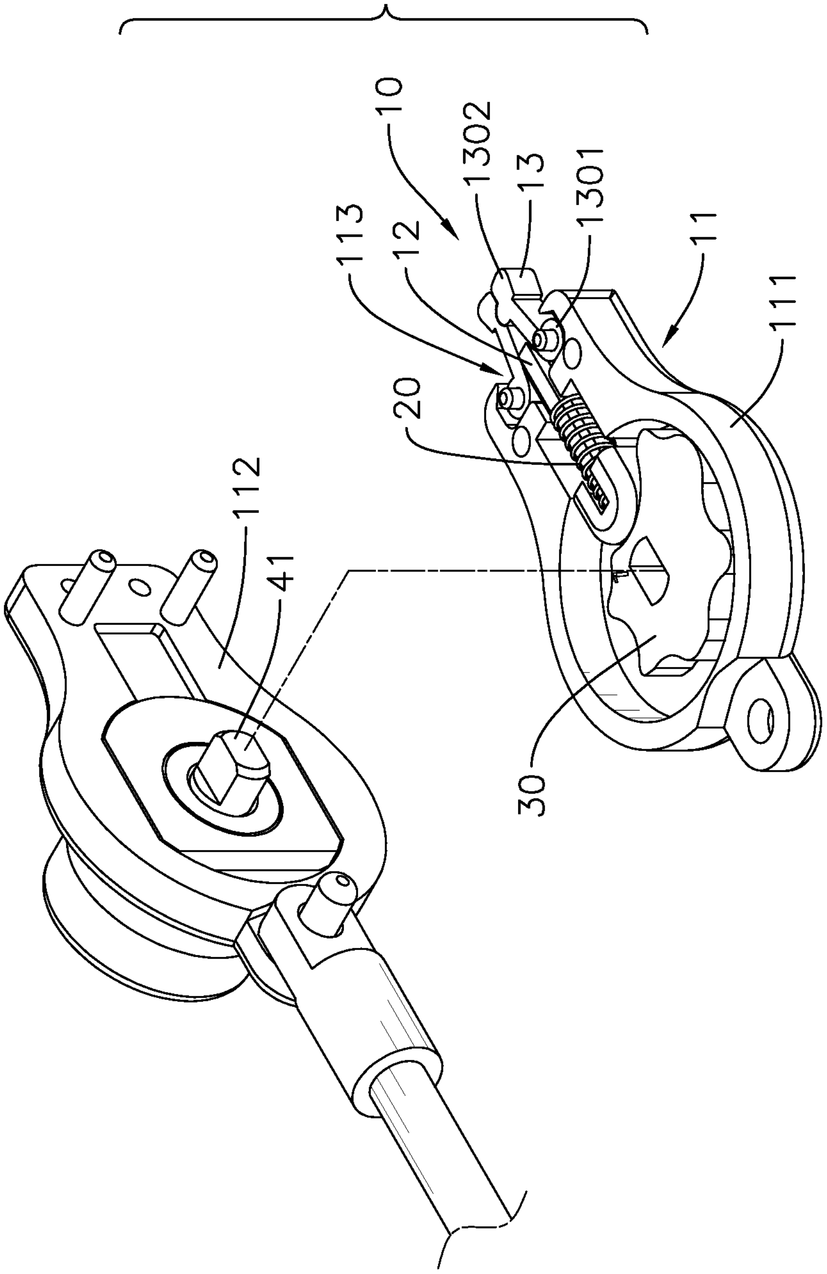
FIG. 2 is an exploded perspective view of the universal security lock in FIG. 1.

With reference to FIGS. 1 and 2, the lock core 40 is disposed on the upper cover 112 of the base 11 and is connected to the controlling part 30. In the preferred embodiment, a shaft 41 (as shown in FIG. 2) of the lock core 40 is mounted through a connecting hole in the center of the controlling part 30 to rotate the controlling part 30.

The lock core 40 has an unlocked status and a locked status; in the unlocked status, the lock core 40 is rotatable relative to the base 11 and is capable of rotating the controlling part 30; in the locked status, the lock core is unrotatable relative to the base 11. The lock core 40 can be switched between the locked status and the unlocked status using a key (not shown in figures).

With reference to FIGS. 4 and 5, when the lock core 40 is in the unlocked status, a user may rotate the controlling part 30 via the lock core 40 such that the two electronic-device-engaging portions 133 of the two gripping fingers 13 are moved away from each other and engage in a recess-shaped security slot 91.

In the preferred embodiment, the lock core 40 drives the expanding rod 12 to move along the engaging direction S via direct abutting of the annular curved surface 31 against the expanding rod 12, but the lock core 40 is not limited thereto. In another preferred embodiment, the lock core 40 drives the expanding rod 12 to move via force from a resilient element or mutually repelled magnetic elements to drive the expanding rod 12 along the engaging direction S. The resilient element is preferably a compression spring.

The lock core 40 is, but not limited to, a cylindrical lock. In another embodiment, the lock core 40 is a push lock or a combination lock.

Figure 10A:
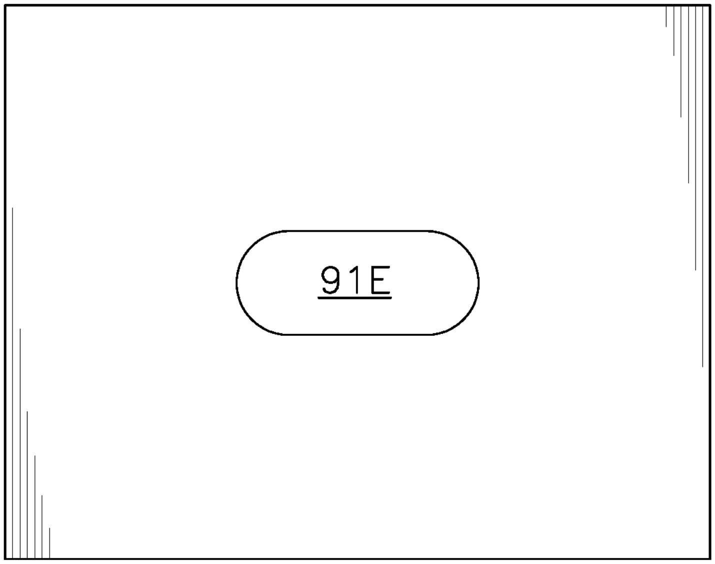
FIG. 10A is a front view of an oblong security slot.
Figure 10B:
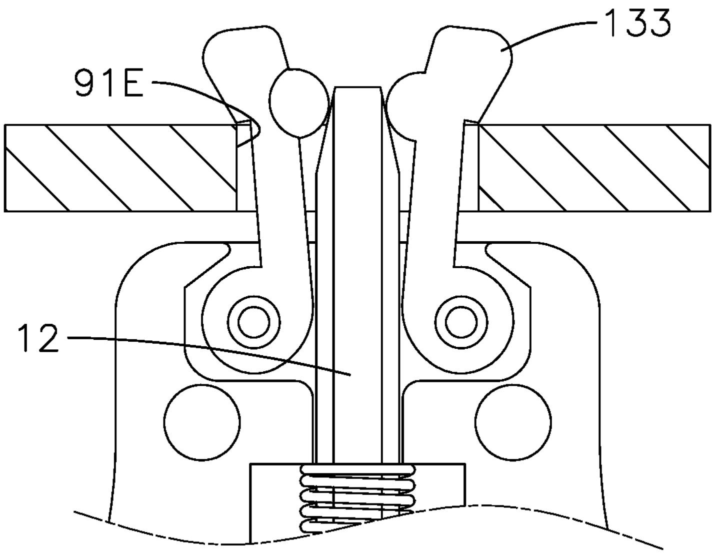
FIG. 10B is an enlarged schematic top view of the universal security lock in FIG. 1, showing the universal security lock engaged in the oblong security slot shown in FIG. 10A.

With reference to FIGS. 6A to 10B, the user can rotate the lock core 40 to change the position of the expanding rod 12, thereby changing the distance between the two electronic-device-engaging portions 133 and engaging the engaging mechanism 10 to security slots 91 of different widths. For example, a 5-22 mm-wide security slot 91A (as shown in FIGS. 6A and 6B), a 5.5-mm-wide security slot 91B (as shown in FIGS. 7A and 7B), a 6-mm-wide security slot 91C (as shown in FIGS. 8A and 8B), a 7-mm-wide security slot 91D (as shown in FIGS. 9A and 9B), and an oblong security slot 91E (as shown in FIGS. 10A and 10B). The aforementioned six different types of security slots 91 are security slots of standard specifications.

Figure 11:
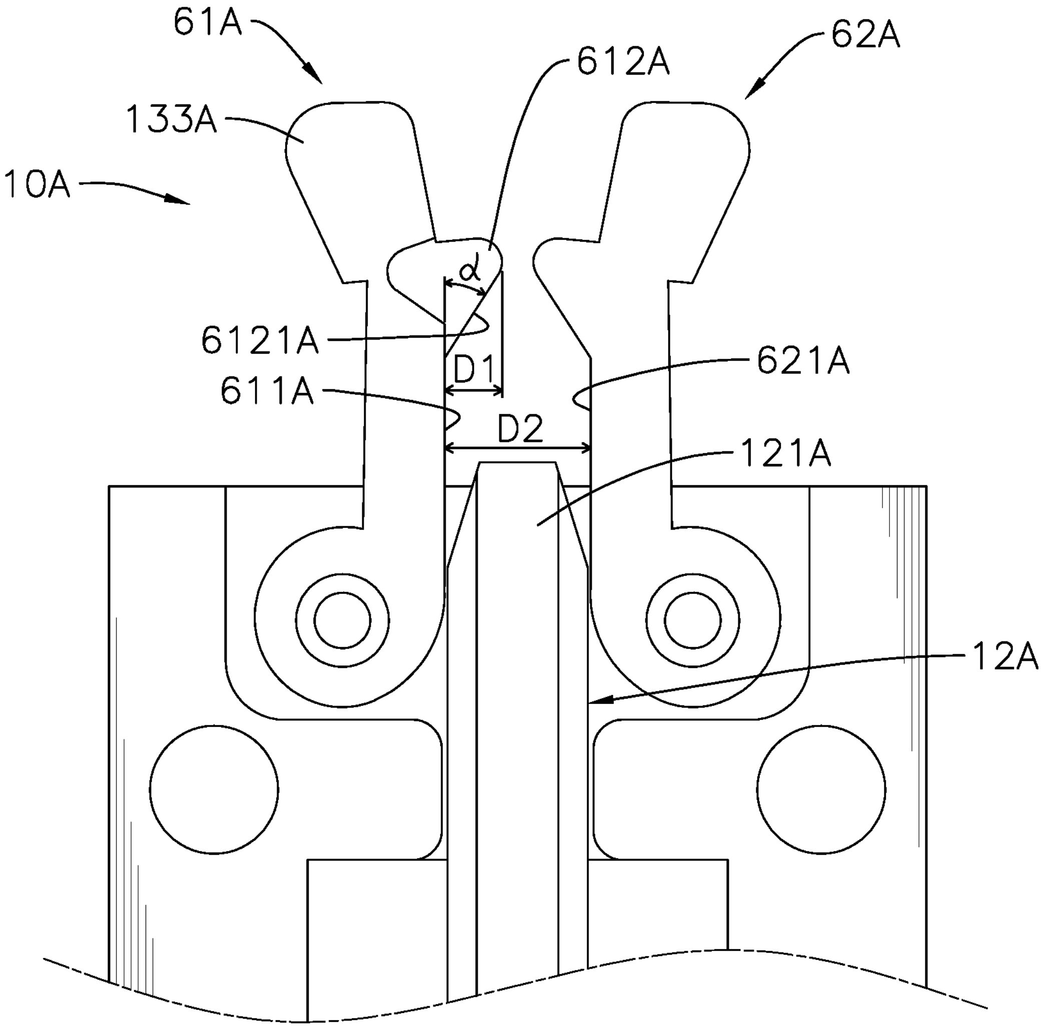
FIG. 11 is an enlarged schematic top view of a second embodiment of a universal security lock for portable electronic devices in accordance with the present invention.

With reference to FIG. 11, a second embodiment of the present invention is substantially same as the first embodiment, but difference is that the first protrusion 612A of the first gripping finger 61A has an abutting incline 6121A, and the abutting end 121A of the expanding rod 12A selectively abuts against the abutting incline 6121A of the first protrusion 612A to move the electronic-device-engaging portion 133A of the first gripping finger 13A.

An angle α between the abutting incline 6121A and the first abutting area 611A is preferably from 30 degrees to 40 degrees to ensure that the expanding rod 12A effectively pushes the first gripping finger 61A away from the second gripping finger 62A. To be precise, the angle α is from 32 degrees to 34 degrees.

By forming the abutting incline 6121A, the angle α between the abutting incline 6121A and the expanding rod 12A is sufficiently small and does not change rapidly. As a result, force required to drive the expanding rod 12A to move is more stable.

Additionally, the engaging mechanism 10 has a protruding distance D1 and a finger distance D2. The protruding distance D1 is defined as a distance of the abutting incline 6121A protruding from the first abutting area 611A, and the finger distance D2 is defined as a distance between the first abutting area 611A of the first gripping finger 61A and the second abutting area 621A of the second gripping finger 62A when the first abutting area 611A and the second abutting area 621A are parallel to each other. A ratio of the protruding distance D1 to the finger distance D2 is preferably from 0.25:1 to 0.4:1 to maximize the angle α of the first gripping finger 61A while maintaining structural strength. A ratio of the protruding distance D1 to the finger distance D2 is ideally from 0.35:1 to 0.4:1.

Figure 12:
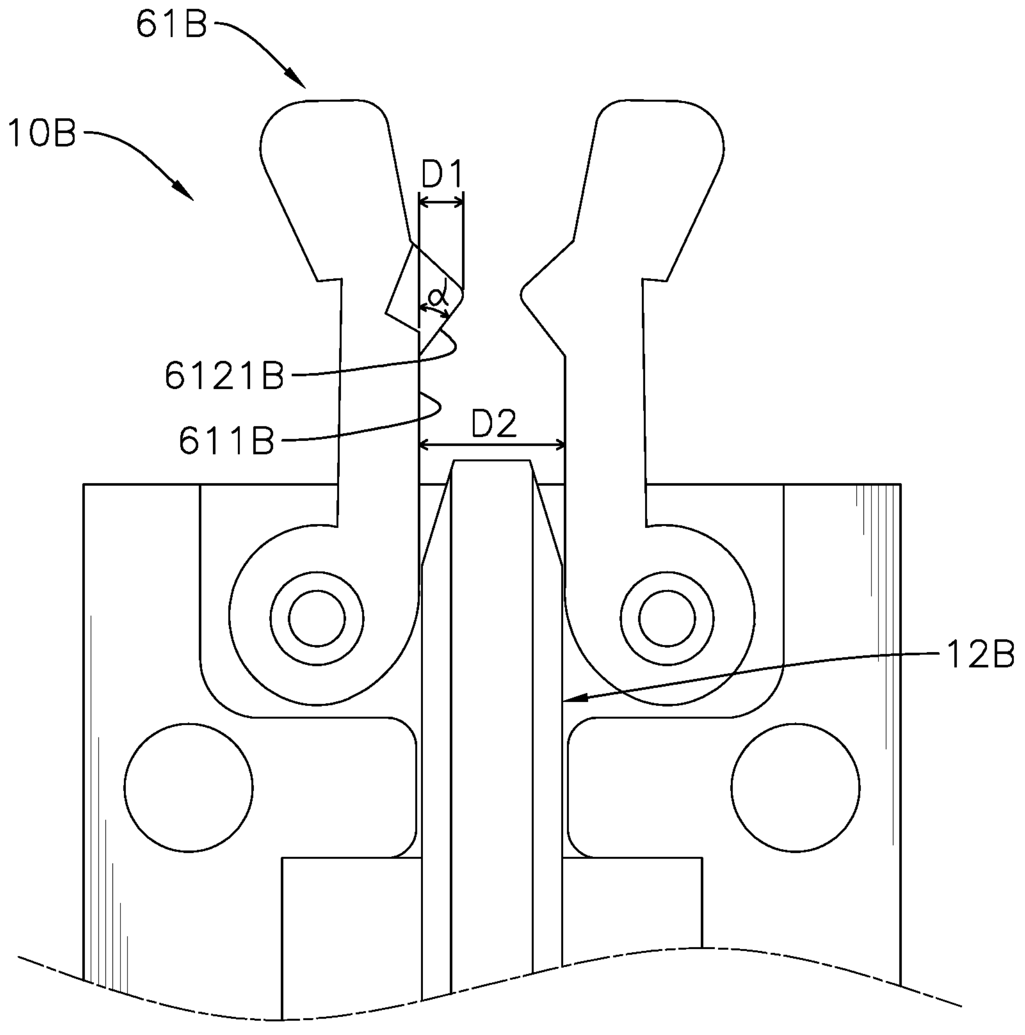
FIG. 12 is an enlarged schematic top view of a third embodiment of a universal security lock for portable electronic devices in accordance with the present invention.

With reference to FIG. 12, a third embodiment of the present invention is substantially same as the second embodiment, but difference is that the angle α between the abutting incline 6121B and the first abutting area 611B is from 36 degrees to 38 degrees, and meanwhile the ratio of the protruding distance D1 to the finger distance D2 is ideally from 0.25:1 to 0.3:1. By having a slightly larger angle α, a smaller stroke of the expanding rod 12B leads to larger rotation of the first gripping finger 61B, making the engaging mechanism 10B more responsive to operation of the user.

In summary, movement of the expanding rod 12 along the engaging direction S gradually expands the two gripping fingers 13 to engage the two gripping fingers 13 in the security slot 91; that is, as long as the expanding rod 12 is continuously pushed along the engaging direction S, the two gripping fingers 13 will be expanded until stopped by width of the security slot 91. Therefore, the present invention is compatible with security slots 91 of different widths and can be adjusted in a stepless manner.

Additionally, the protrusions of the gripping fingers 13 allow the engaging mechanism 10 to engage in wider security slots 91 without increasing size of the engaging mechanism 10, thereby reducing size of the engaging mechanism 10.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An engaging mechanism of a universal security lock for portable electronic devices comprising:

a base having an engaging direction;

an expanding rod disposed on the base and being slidable along the engaging direction; an end, which is toward the engaging direction, of the expanding rod being defined as an abutting end; a width of the abutting end gradually decreasing toward the engaging direction;

two gripping fingers being elongated; each of the gripping fingers having:

an inner end pivotally connected to the base; each of the two inner ends of the two gripping fingers disposed on a respective one of two opposite sides of the expanding rod;

an inner surface facing toward another one of the gripping fingers;

an outer surface being opposite to the inner surface; and an electronic-device-engaging portion protruding from the outer surface and disposed on an outer end of the gripping finger;

wherein when the expanding rod is moved toward the engaging direction, the abutting end of the expanding rod abuts against the two inner surfaces of the two gripping fingers and drives the two electronic-device-engaging portions to move away from each other gradually; and wherein the two gripping fingers are respectively defined as a first gripping finger and a second gripping finger; the inner surface of the first gripping finger has a first abutting area and a first protrusion; the first protrusion protrudes from the first abutting area and extends toward the second gripping finger; the abutting end of the expanding rod selectively abuts against the first abutting area or the first protrusion; wherein, the second gripping finger has:

a second abutting area formed on the inner surface, and the second abutting area having a second protrusion protruding from the second abutting area and extending toward the first gripping finger; the abutting end of the expanding rod selectively abutting against the second abutting area or the second protrusion; and a first recess formed in the second abutting area; and when the first gripping finger and the second gripping finger pivot toward each other, the first protrusion of the first gripping finger is movable into the first recess of the second gripping finger; and the first gripping finger has:

a second recess formed in the first abutting area; and when the first gripping finger and the second gripping finger pivot toward each other, the second protrusion of the second gripping finger is movable into the second recess of the first gripping finger.

2. The engaging mechanism as claimed in claim 1, wherein the first protrusion of the first gripping finger has an abutting curved surface; and the abutting end of the expanding rod selectively abuts against the abutting curved surface of the first protrusion to move the electronic-device-engaging portion of the first gripping finger.

3. The engaging mechanism as claimed in claim 1, wherein the first protrusion of the first gripping finger has an abutting incline; and the abutting end of the expanding rod selectively abuts against the abutting incline of the first protrusion to move the electronic-device-engaging portion of the first gripping finger.

4. The engaging mechanism as claimed in claim 1, wherein the first protrusion of the first gripping finger has an abutting incline;

an angle between the abutting incline and the first abutting area is from degrees to 40 degrees;

the abutting end of the expanding rod selectively abuts against the abutting incline of the first protrusion to move the electronic-device-engaging portion of the first gripping finger;

the engaging mechanism has a protruding distance defined as a distance of the abutting incline protruding from the first abutting area;

a finger distance defined as a distance between the first abutting area of the first gripping finger and the second abutting area of the second gripping finger when the first abutting area and the second abutting area are parallel to each other; and a ratio of the protruding distance to the finger distance is from 0.25:1 to 0.4:1.

5. The engaging mechanism as claimed in claim 1, wherein the expanding rod has two guide inclines; each of the two guide inclines formed on a respective one of two opposite sides of the expanding rod and being inclined relative to the centerline of the expanding rod; the two guide inclines extending along the engaging direction to an end surface of the abutting end; a distance between the two guide inclines being gradually reduced toward the engaging direction.

6. A universal security lock for portable electronic devices, comprising:

an engaging mechanism having:

a base having an engaging direction;

an expanding rod disposed on the base and being slidable along the engaging direction; an end, which is toward the engaging direction, of the expanding rod being defined as an abutting end; a width of the abutting end gradually decreasing toward the engaging direction;

two gripping fingers being elongated; each of the gripping fingers having:

an inner end pivotally connected to the base; each of the two inner ends of the two gripping fingers disposed on a respective one of two opposite sides of the expanding rod;

an inner surface facing toward another one of the gripping fingers;

an outer surface being opposite to the inner surface; and an electronic-device-engaging portion protruding from the outer surface and disposed on an outer end of the gripping finger;

wherein when the expanding rod is moved toward the engaging direction, the abutting end of the expanding rod abuts against the two inner surfaces of the two gripping fingers and drives the two electronic-device-engaging portions to move away from each other gradually; and wherein the two gripping fingers are respectively defined as a first gripping finger and a second gripping finger; the inner surface of the first gripping finger has a first abutting area and a first protrusion; the first protrusion protrudes from the first abutting area and extends toward the second gripping finger; the abutting end of the expanding rod selectively abuts against the first abutting area or the first protrusion;

a rod-returning resilient element connected to the expanding rod of the engaging mechanism and driving the expanding rod to move in a direction reverse to the engaging direction;

a controlling part rotatably disposed in the base of the engaging mechanism; the controlling part and the expanding rod arranged along the engaging direction; and a lock core disposed on the base of the engaging mechanism and connected to the controlling part; the lock core having an unlocked status and a locked status; in the unlocked status, the lock core being rotatable relative to the base; in the locked status, the lock core being unrotatable relative to the base;

wherein when the controlling part is rotated relative to the base, the expanding rod of the engaging mechanism is driven by rotation of the controlling part to change a position of the expanding rod along the engaging direction, thereby changing a distance between the two electronic-device-engaging portions.

7. The universal security lock as claimed in claim 6, wherein the controlling part has an annular curved surface surrounding a rotation axis of the controlling part and is capable of driving the expanding rod of the engaging mechanism to move along the engaging direction; and when the controlling part is rotated relative to the base, the expanding rod of the engaging mechanism is driven by the annular curved surface to change the position of the expanding rod along the engaging direction, thereby changing a distance between the two electronic-device-engaging portions.

8. The universal security lock as claimed in claim 6, wherein the second gripping finger has a second abutting area formed on the inner surface; and a first recess formed in the second abutting area; and when the first gripping finger and the second gripping finger pivot toward each other, the first protrusion of the first gripping finger is movable into the first recess of the second gripping finger.

9. The universal security lock as claimed in claim 8, wherein the second abutting area of the second gripping finger has a second protrusion; the second protrusion protrudes from the second abutting area and extends toward the first gripping finger;

the abutting end of the expanding rod selectively abuts against the second abutting area or the second protrusion;

the first gripping finger has a second recess formed in the first abutting area; and when the first gripping finger and the second gripping finger pivot toward each other, the second protrusion of the second gripping finger is movable into the second recess of the first gripping finger.

10. The universal security lock as claimed in claim 6, wherein the first protrusion of the first gripping finger has an abutting curved surface; and the abutting end of the expanding rod selectively abuts against the abutting curved surface of the first protrusion to move the electronic-device-engaging portion of the first gripping finger.

11. The universal security lock as claimed in claim 6, wherein the first protrusion of the first gripping finger has an abutting incline; and the abutting end of the expanding rod selectively abuts against the abutting incline of the first protrusion to move the electronic-device-engaging portion of the first gripping finger.

12. The universal security lock as claimed in claim 9, wherein the first protrusion of the first gripping finger has an abutting incline;

an angle between the abutting incline and the first abutting area is from degrees to 40 degrees;

the abutting end of the expanding rod selectively abuts against the abutting incline of the first protrusion to move the electronic-device-engaging portion of the first gripping finger;

the engaging mechanism has a protruding distance defined as a distance of the abutting incline protruding from the first abutting area;

a finger distance defined as a distance between the first abutting area of the first gripping finger and the second abutting area of the second gripping finger when the first abutting area and the second abutting area are parallel to each other; and a ratio of the protruding distance to the finger distance is from 0.25:1 to 0.4:1.

13. The universal security lock as claimed in claim 6, wherein the expanding rod has two guide inclines; each of the two guide inclines formed on a respective one of two opposite sides of the expanding rod and being inclined relative to the centerline of the expanding rod; the two guide inclines extending along the engaging direction to an end surface of the abutting end; a distance between the two guide inclines being gradually reduced toward the engaging direction.

* * * * *